(12) United States Patent
Ripper et al.

(10) Patent No.: US 7,849,675 B2
(45) Date of Patent: Dec. 14, 2010

(54) SUPPLY SYSTEM FOR A MEDIUM FOR TREATING EXHAUST GASES OF AN INTERNAL COMBUSTION ENGINE; EXHAUST GAS CLEANING DEVICE; AND A METHOD FOR OPERATING A SUPPLY SYSTEM

(75) Inventors: Wolfgang Ripper, Stuttgart (DE); Markus Buerglin, Ditzingen (DE); Goetz Flender, Stuttgart (DE); Ulrich Meingast, Stuttgart (DE); Dirk Heilig, Ditzingen (DE); Dirk Von Meduna, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 911 days.

(21) Appl. No.: 11/576,196

(22) PCT Filed: Jul. 19, 2005

(86) PCT No.: PCT/EP2005/053478

§ 371 (c)(1),
(2), (4) Date: Mar. 28, 2007

(87) PCT Pub. No.: WO2006/034891

PCT Pub. Date: Apr. 6, 2006

(65) Prior Publication Data

US 2007/0266699 A1  Nov. 22, 2007

(30) Foreign Application Priority Data

Sep. 28, 2004  (DE) .................. 10 2004 046 881

(51) Int. Cl.
*F01N 3/00*  (2006.01)
*B60T 8/36*  (2006.01)
*F16L 37/00* (2006.01)
*F17D 3/00* (2006.01)
*B08B 9/02* (2006.01)
*C02F 1/68* (2006.01)
*F16L 58/00* (2006.01)

(52) U.S. Cl. ........................ 60/286; 60/295; 137/599.01; 137/599.14

(58) Field of Classification Search ................... 60/286, 60/295; 137/599.01, 599.14
See application file for complete search history.

(56) References Cited

U.S. PATENT DOCUMENTS 6,481,641 B1  11/2002 Mieney

FOREIGN PATENT DOCUMENTS

| DE | 103 24 482 A1 | 12/2004 |
| EP | 1 323 918 A2  | 7/2003 |
| JP | 8246850 A     | 9/1996 |
| WO | WO 03/084647 A1 | 10/2003 |

*Primary Examiner*—Thomas E Denion
*Assistant Examiner*—Michael Carton
(74) *Attorney, Agent, or Firm*—Ronald E. Greigg

(57) ABSTRACT

A medium supply system of an exhaust gas cleaning device for treating the exhaust gas of an internal combustion engine comprising a storage tank and a supply line which is connected to the storage tank for supplying the medium to a dosing unit connected to an exhaust pipe and to a recycling line for recycling the medium to the storage tank. The supply line and/or the recycling line are provided with at least one conduit area comprising at least one first and second parallel partial channels for the medium circulation, wherein said partial channels exhibit different insulation properties. An exhaust gas cleaning device comprising the inventive supply system and a method for the operation thereof are also disclosed.

20 Claims, 2 Drawing Sheets

SUPPLY SYSTEM FOR A MEDIUM FOR TREATING EXHAUST GASES OF AN INTERNAL COMBUSTION ENGINE; EXHAUST GAS CLEANING DEVICE; AND A METHOD FOR OPERATING A SUPPLY SYSTEM

CROSS-REFERENCE TO RELATED APPLICATION

This application is a 35 USC 371 application of PCT/EP 2005/053478 filed on Jul. 19, 2005.

BACKGROUND OF THE INVENTION

1. Field of the Invention

The invention is directed to an improved supply system for a medium, in particular for treating exhaust gases of an internal combustion engine, to an improved exhaust gas cleaning device, and to method for operating such a supply system.

2. Description of the Prior Art

To reduce the nitrogen oxides contained in the exhaust gas of an internal combustion engine, for such engines, especially those with self-ignition, a method for selective catalytic reduction has proved advantageous. In this method, the nitrogen oxides together with ammonia are converted into nitrogen and water in a selective catalytic converter. The medium required for the catalytic conversion of the nitrogen oxides, such as a reducing agent, is carried along in the vehicle, instead of the ammonia, in the form of an aqueous urea solution, from which the ammonia can be liberated by hydrolysis of the urea solution, in whatever quantity is needed for the conversion. When the fuel tank is being filled, the reducing agent is introduced into a separate storage tank and supplied to the exhaust gas flow via a supply line to a metering unit, such as a metering valve, disposed directly on the exhaust gas tube.

To assure perfect function of the metering valve, this valve must on the one hand be cooled. On the other hand, depending on the urea concentration, there is the risk that the aqueous urea solution will freeze at certain temperatures. The expansion behavior of the urea solution is similar to that of water. If the freezing urea solution cannot expand, then impermissibly high pressures can occur in the interior of components that are filled with the urea solution, and these pressures can cause the destruction of those components. It is known, in the work chamber of a metering valve, to provide walls or elements that at least partially yield to pressure and that can reversibly compensate for a pressure in the work chamber that occurs when ice forms. The alternative in which at least one region between a pump and the metering unit can be evacuated oppositely to the pumping direction in normal operation is also known. Damage to the metering unit from unwanted ice formation at low outdoor temperatures, and in particular a buildup of excessively high ice pressures in the assembly, however, is not reliably avoidable by those provisions.

To prevent the medium from heating up too severely, it must be assured that the amount of heat that is absorbed by the cooling medium at the metering unit is dissipated to the environment again. This is preferably done by the metering unit via a return line that leads back to the storage tank. A problem here is that the storage tank must be thermally insulated, to prevent freezing of the medium for as long as possible. Moreover, the lines must be insulated so that thawing of the medium located in the lines after it has frozen can be accomplished as quickly as possible and in a way that reduces high energy losses. Hence there is a conflict in terms of the aims between the best possible insulation with a view to the freezing behavior of the medium and the best possible insulating action, to assure heat dissipation.

SUMMARY AND ADVANTAGES OF THE INVENTION

The invention is based on a supply system for a medium, in particular for an exhaust gas cleaning device for treating exhaust gases of an internal combustion engine, having a storage tank and a supply line connected to the tank for supplying the medium to the storage tank.

It is proposed that a supply line and/or a return line has at least one line region with at least one first partial channel and one second partial channel extending parallel to the first in terms of the flow, and the partial channels have different thermal insulation properties. Thus the heat absorbed at the metering unit can be dissipated to the environment, with simultaneous insulation of the entire circuit for the medium. The medium is preferably a medium that freezes under normal operating conditions, especially an aqueous urea solution. The invention is also based on an exhaust gas cleaning device with a supply line according to the invention and on a method for operating the supply line of the invention.

Preferably, the two partial channels have different heat dissipation properties; in particular, the two partial channels are embodied as highly different in terms of their thermal insulation. The line region split in two is preferably disposed in a region of a return line between a metering unit and a storage tank. Advantageously, one of the partial channels is free of thermal insulation, while the other partial channel may be insulated. It may be provided that the medium flowing back again can be directed, after a first starting event of the engine, into the first, thermally insulated partial channel of the return line. Advantageously, the thawing of frozen lines after engine starting is speeded up as a result. After it has thawed, the medium flowing back again can be directed into the second, uninsulated partial channel of the return line. The primary flow of the medium can thus be conducted in staggered fashion through the second partial channel, in order to assure the heat dissipation desired. As a suitable cooling medium which can prevent overheating of the medium, the medium itself can be employed, since this medium has to be supplied to the metering unit in any case.

To speed up the thawing of frozen lines after engine starting and to assure the delivery circulation, the supply line and the return line may be electrically heatable. In a preferred embodiment, the first and second partial channels are separately heatable; the second, uninsulated partial channel can first be excluded from the heating in order to limit the heating power or to speed up the thawing of the first partial channel. In this embodiment, only after the thawing of the first partial channel is the second partial channel heated, so as to speed up its thawing in a staggered way. The heating of the first partial channel is then switched off. As soon as the second partial channel has thawed, its heating can be switched off. The primary flow of the medium can now flow through the second partial channel, and the desired heat dissipation can preferably take place through the second partial channel.

In a preferred embodiment of the invention, a supply of the medium into only one of the partial channels, or a quantitative allocation of the medium to the first and second partial channels is controllable. For this purpose, different provisions and devices are preferably provided at a branching point where a first line region of the return line branches off into the first and second partial channels, and/or at a connection point where the first and second partial channels reunite in a second line region of the return line.

The supply or allocation can be adjustable by means of an angle of approach between a first primary flow direction in a first line region of the return line and the first and/or the second partial channel. Preferably, the supply or allocation can be controlled by means of a ratio in size of a first angle of approach and a second angle of approach. The first angle of approach is located between a first primary flow direction, in a first line region of the return line, upstream of the branching point, and an inflow direction into the first partial channel. The second angle of approach is located between the first primary flow direction in the first line region of the return line and a primary flow direction in the second partial channel. The second angle of approach is preferably smaller than the first angle of approach; the second angle of approach is preferably 10°, and the first angle of approach is preferably at least 80°. In an especially preferred embodiment of the exhaust gas cleaning device of the invention, the second angle of approach is 0°, and the first angle of approach is 90°. This has the advantage that because of the inertia and the existing flow velocity, the primary flow of medium in the return line flows through the second partial channel. The angles given each relate to the installed position in the vehicle.

Moreover, the supply or allocation can be adjustable by means of an outflow angle between a second primary flow direction in a second line region of the return line and the first and/or the second partial channel. Preferably, the supply or allocation can be controlled by a ratio of the size of a first and second outflow angle. The first outflow angle is located between a second primary flow direction in a second line region of the return line downstream of the connecting point and an outflow direction out of the first partial channel. The second outflow angle is disposed between the primary flow direction in the second line region of the return line and the second primary flow direction in the second partial channel. The first outflow angle is preferably smaller than the second outflow angle; the first outflow angle is preferably at most 10°, and the second outflow angle is preferably at least 80°. In an especially preferred embodiment of the exhaust gas device of the invention, the second outflow angle is 0°, and the first outflow angle is 90°. As a result, a flow of the medium through the second partial channel can favorably be attained.

A supply or diversion of the medium through the first or the second partial channel can also be accomplished by means of devices and provisions that are provided at different points than the region of the branching point and the connecting point. In particular, the medium flowing back into the storage tank through the first and/or second partial channel of the return line can be adjustable by means of different flow cross sections of the partial channels. In particular, a first flow cross section of the first partial channel can be smaller than a second flow cross section of the second partial channel; as a result, advantageously, the supply or deviation of the medium into the second partial channel with the larger second flow cross section is adjusted once the frozen medium in the second partial channel has thawed. One or more constrictions, for instance in the form of throttle constrictions, may also be provided in the first partial channel in order to achieve an intended deviation of the primary flow of the medium into the second partial channel.

The supply or diversion of the medium can furthermore be controlled by a valve, such as a shutoff valve. In particular, one thermostat valve each may be provided at the branching point and/or at the connecting point and/or in the first partial channel. This valve can regulate an opening of the second partial channel and a closure of the first partial channel for the medium flowing through the lines at a defined temperature, such as 60°.

To achieve especially efficient heat dissipation in the region of the second partial channel, this channel, in the installed position, can be disposed in a lengthwise region that is crosswise to the ram pressure of the relative wind. As a result, the largest possible surface area of the second partial channel is exposed to the relative wind, and as a result the heat dissipation can be additionally reinforced.

The second partial channel can furthermore have additional active cooling devices, for instance in the form of guide baffles disposed laterally of the second partial channel, which assure a replenishing flow of cool air. This embodiment can be advantageous particularly whenever the second partial channel is not located crosswise to the ram pressure of the relative wind but rather at some other angle, and in particular parallel to the relative wind. The second partial channel can also be provided with cooling fins, to increase the heat dissipation. The disposition of any other active cooling device with a comparable action is also conceivable.

BRIEF DESCRIPTION OF THE DRAWINGS

The invention is described in further detail below in conjunction with the associated drawings, in which.

DESCRIPTION OF THE PREFERRED EMBODIMENTS

Figure 1:
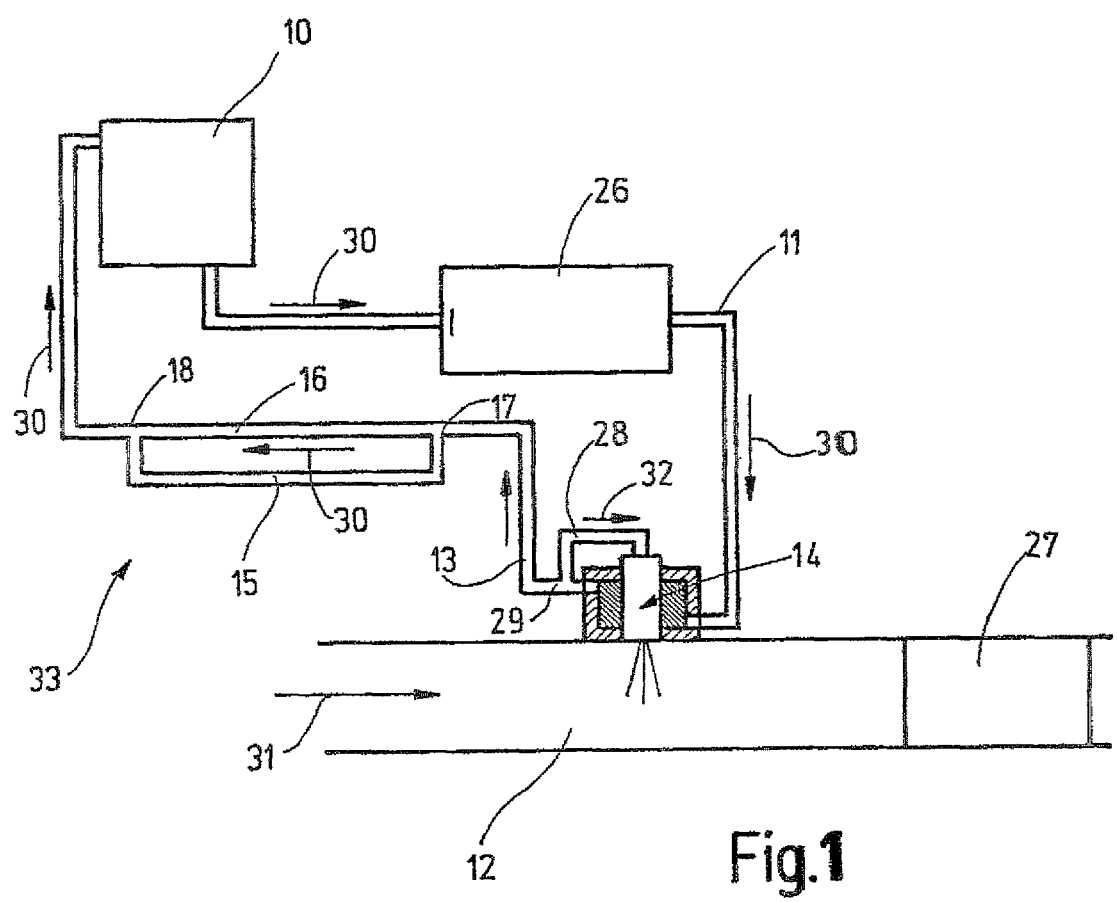
FIG. 1 schematically shows a preferred supply system in an exhaust system of a vehicle.

A preferred supply system for a medium, in particular for treating exhaust gases of an internal combustion engine, is shown in simplified form in FIG. 1. A medium, preferably a medium that can freeze under normal operating conditions, such as an aqueous urea solution, is stored in a storage tank 10 as a reducing agent for cleaning exhaust gases of an internal combustion engine and can be introduced into a metering unit 14 via a pump 26 and a supply line 11. The pump 26 pumps in a pumping direction 30 for normal operation, represented by an arrow, to the metering unit 14, which outputs the medium directly into an exhaust gas line 12. For exhaust gas cleaning, the medium is introduced via the exhaust gas line 12 into a catalytic converter 27. An exhaust gas flow direction 31 in the exhaust gas line 12 is represented by an arrow. From the metering unit 14, the excess medium is pumped back into the storage tank 10 via a return line 13, in the pumping direction 30 for normal operation, represented by an arrow.

In a preferred feature of the invention, the supply line 11 and/or the return line 13 has at least one line region 33, with at least one first partial channel 15 and one second partial channel 16 parallel to it in terms of flow; the partial channels 15, 16 have different thermal insulation properties. The partial channels 15, 16 in particular have different heat dissipation properties.

At a branching point 17, the return line 13 splits into the two partial channels 15, 16, which join again at a connecting point 18. According to the invention, only one of the partial channels 15, 16 is free of thermal insulation. In FIG. 1, only the second partial channel 16 is free of thermal insulation. After an initial starting event of the engine, the medium flowing back again can be directed into the first, thermally insulated partial channel 15 of the return line 13. This advantageously speeds up the thawing of frozen lines after engine starting. After thawing, the medium flowing back again can be directed into the second, uninsulated partial channel 16 of the return line 13. The primary flow of the medium can thus be carried in staggered fashion through the second partial channel in order to assure the desired heat dissipation.

According to the invention, the first and second partial channels 15, 16 are separately heatable, and in order to limit the heating output the second, uninsulated partial channel 16 is initially excluded from the heating. In the preferred embodiment, the second partial channel 16 is not heated until after the first partial channel 15 has thawed, in order to speed up thawing of the second partial channel in staggered fashion. The heating of the first partial channel 15 is then switched off. As soon as the second partial channel 16 has thawed, its heating can be switched off. The primary flow of the medium can now flow through the second partial channel 16, and the desired heat dissipation then takes place, preferably through the second partial channel 16.

Additional heat dissipation is attained by means of a third partial channel 28, extending parallel to the return line 13; it is disposed downstream between the metering unit 14 and the branching point 17. The third partial channel 28 serves to supply the medium to the metering unit 14, which for heat dissipation is bathed by the medium. A quantity of the medium that is to be metered into it flows through the third partial channel 28. In an alternative embodiment, not show in FIG. 1, the line 28 may also branch off directly from the line 11 into the metering unit 14.

Figure 2:
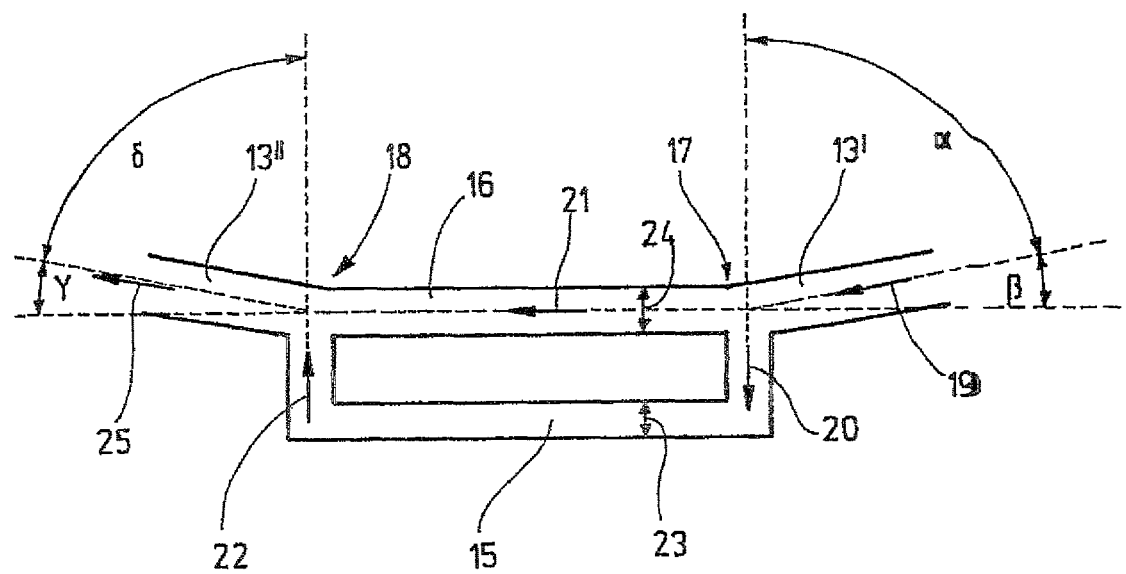
FIG. 2 is an enlarged fragmentary view of the schematic illustration of FIG. 1.

In FIG. 2, an enlarged fragmentary view of the schematic illustration in FIG. 1 is shown. Elements that are or remain essentially the same are identified by the same reference numerals in the drawings. The parallel partial channels 15, 16 branch at the branching point 17 in a first line region 13' of the return line and joined together again at a connecting point 18 disposed in a second line region 13" of the return line 13.

A supply of the medium into only one of the partial channels 15, 16, or a quantitative allocation of the medium to the first and the second partial channels is controllable. According to the invention, the supply or allocation of the medium is adjustable by various provisions and devices; the medium flowing back, after a first starting event of the engine, is preferably delivered first to the first, thermally insulated partial channel 15 of the return line 13. Only after the second, uninsulated partial channel 16 of the return line 13 has thawed is the medium carried into this second partial channel 16.

The supply or allocation of the primary flow of the medium can be adjustable by an angle of approach $\alpha$, $\beta$, and specifically by means of a ratio of size of a first angle of approach a and a second angle of approach $\beta$. The first angle of approach a is disposed between a first primary flow direction 19 in a first line region 13' of the return line 13 upstream of the branching point and an inflow direction 20 into the first partial channel 15. The second angle of approach $\beta$ is located between the first primary flow direction 19 in the first line region 13' of the return line 13 and a second primary flow direction 21 into the second partial channel 16. In FIG. 2, the second angle of approach $\beta$ is smaller than the first angle of approach $\alpha$; the second angle of approach $\beta$ is for instance 10°, and the first angle of approach $\alpha$ is for instance 80°.

The supply or allocation of the medium into the first and/or second partial channel 15, 16 of the return line 13 can furthermore be adjusted by means of an outflow angle $\gamma$, $\delta$, and specifically by means of a size ratio between the first outflow angle $\gamma$ and the second outflow angle $\delta$. The first outflow angle $\gamma$ is disposed between a third primary flow direction 25 in a second line region 13" of the return line 13 downstream of the connecting point 18 and an outflow direction 22 from the first partial channel 15. The second outflow angle $\delta$ is located between the third primary flow direction 25 in the second line region 13" of the return line 13 and the second primary flow direction 21 in the second partial channel 16. In a preferred feature of the invention, the first outflow angle $\delta$ is smaller than the second outflow angle $\delta$, and the first outflow angle $\gamma$ in FIG. 2 amounts to 10°, for instance, and the second outflow angle $\delta$ amounts for instance to 80°.

Moreover, the supply or allocation of the medium flowing back into the storage tank 10 through the first and/or second partial channel 15, 16 of the return line 13 can be adjusted by means of different flow cross sections 23, 24 of the first and second partial channels 15, 16. According to the invention, the first flow cross section 23 of the first partial channel 15 is smaller than the second flow cross section 24 of the second partial channel 16. As a result, a supply or allocation of the medium into the second partial channel 16 after this channel has thawed is controlled.

It may also be provided that the first partial channel 15 has a constriction, such as a throttle restriction. The supply or allocation can furthermore be controlled by a shutoff valve. For instance, one thermostat valve each may be disposed at the branching point 17 and/or at the connecting point 18 and/or in the first partial channel 15. These devices are not shown in the drawings.

The second partial channel 16 of the return line 13 may also, in the installed position, be disposed in a lengthwise region that is crosswise to the ram pressure of the relative wind. The second partial channel 16 can moreover have farther active cooling devices, for instance in the form of guide baffles or cooling fins, for reinforcing the cooling process.

The foregoing relates to a preferred exemplary embodiment of the invention, it being understood that other variants and embodiments thereof are possible within the spirit and scope of the invention, the latter being defined by the appended claims.

The invention claimed is:

1. In a supply system for a medium for an exhaust gas cleaning device for treating exhaust gases of an internal combustion engine, having a storage tank, a supply line connected to the tank for supplying the medium to a metering unit, communicating with an exhaust gas line, and having a return line for returning the medium to the storage tank, the improvement wherein the supply line and/or the return line has at least one line region with at least one first partial channel and one second partial channel extending parallel to the first in terms of the flow, and wherein the partial channels have different thermal insulation properties.

2. The supply system as defined by claim 1, wherein the partial channels have different heat dissipation properties.

3. The supply system as defined by claim 1, wherein one of the partial channels is free of thermal insulation.

4. The supply system as defined by claim 2, wherein one of the partial channels is free of thermal insulation.

5. The supply system as defined by claim 1, further comprising means separately heating the first and second partial channels.

6. The supply system as defined by claim 2, further comprising means separately heating the first and second partial channels.

7. The supply system as defined by claim 3, further comprising means separately heating the first and second partial channels.

8. The supply system as defined by claim 1, further comprising means for controlling the supply of the medium into only one of the partial channels or a quantitative allocation of the medium to the first and the second partial channels.

9. The supply system as defined by claim 5, further comprising means for controlling the supply of the medium into only one of the partial channels or a quantitative allocation of the medium to the first and the second partial channels.

10. The supply system as defined by claim 3, further comprising means for directing the medium flowing back into the storage tank after an initial starting event of the engine, into the first, thermally insulated partial channel of the return line.

11. The supply system as defined by claim 8, wherein the supply or allocation is controlled by means of the angle of approach between a first primary flow direction in a first line region of the return line and the first and/or the second partial channel.

12. The supply system as defined by claim 10, wherein the supply or allocation is controlled by means of the angle of approach between a first primary flow direction in a first line region of the return line and the first and/or the second partial channel.

13. The supply system as defined by claim 8, wherein the supply or allocation is controlled by means of the outflow angle between a second primary flow direction in a second line region of the return line and the first and/or the second partial channel.

14. The supply system as defined by claim 10, wherein the supply or allocation is controlled by means of the outflow angle between a second primary flow direction in a second line region of the return line and the first and/or the second partial channel.

15. The supply system as defined by claim 11, wherein the supply or allocation is controlled by means of the outflow angle between a second primary flow direction in a second line region of the return line and the first and/or the second partial channel.

16. The supply system as defined by claim 8, wherein the supply or allocation is controllable by means of different flow cross sections of the partial channels.

17. The supply system as defined by claim 13, wherein the supply or allocation is controllable by means of different flow cross sections of the partial channels.

18. The supply system as defined by claim 16, wherein the means for controlling the supply or allocation comprises a valve in one of the partial channels.

19. An exhaust gas cleaning device for use in an exhaust gas supply system having a storage tank, a supply line connected to the tank for supplying the medium to a metering unit, communicating with an exhaust gas line, and having a return line for returning the medium to the storage tank, the device comprising at least one line region in the supply line and/or return line with at least one first partial channel and one second partial channel extending parallel to one another in the flow direction, the partial channels having different thermal insulation properties.

20. A method for operating a supply system for a medium, for an exhaust gas cleaning device for treating exhaust gases of an internal combustion engine, having a storage tank, a supply line connected to the tank for supplying the medium to a metering unit, communicating with an exhaust gas line, and having a return line for returning the medium to the storage tank, the method comprising directing a primary flow of a medium, after an initial starting event of an internal combustion engine, into a first, thermally insulated partial channel of a return line, and after thawing, the primary flow of the medium is directed into a second, parallel, thermal-insulation-free partial channel.

* * * * *

UNITED STATES PATENT AND TRADEMARK OFFICE
CERTIFICATE OF CORRECTION

| | | |
|---|---|---|
| PATENT NO. | : 7,849,675 B2 | Page 1 of 1 |
| APPLICATION NO. | : 11/576196 | |
| DATED | : December 14, 2010 | |
| INVENTOR(S) | : Wolfgang Ripper et al. | |

It is certified that error appears in the above-identified patent and that said Letters Patent is hereby corrected as shown below:

- Page 6, Column 6, Line 47, Delete the second occurrence of "the" and insert --a--.

Signed and Sealed this
Twenty-second Day of March, 2011

David J. Kappos
*Director of the United States Patent and Trademark Office*